United States Patent

[11] 3,624,486

[72] Inventor Robert M. Oates
      Lima, Ohio
[21] Appl. No. 17,131
[22] Filed Mar. 6, 1970
[45] Patented Nov. 30, 1971
[73] Assignee Westinghouse Electric Corporation
      Pittsburgh, Pa.

[54] APPARATUS FOR CONTROLLING PULSE WIDTH
     MODULATION OF INVERTER CIRCUITS
     8 Claims, 6 Drawing Figs.
[52] U.S. Cl. .................................................. 321/5,
                                       321/9 A, 321/18,
[51] Int. Cl. ............................................... H02m 7/52
                                                H02m/1/12
[50] Field of Search .................................... 321/5, 9, 9
                                            A, 18; 330/10

[56]              References Cited
            UNITED STATES PATENTS
3,346,794  10/1967  Stemmler .....................  321/9 A
3,461,373   8/1969  Mokrytzki ....................  321/9 A
3,487,288  12/1969  Reid ...........................  321/9 A
3,509,479   4/1970  Gucker et al. ................  330/10

Primary Examiner—William H. Beha, Jr.
Attorneys—F. H. Henson, C. F. Renz and M. P. Lynch ABSTRACT: The invention comprises apparatus for providing pulse width modulation suitable to single pole, or half bridge, inverter circuits employing electronic switches wherein a comparator circuit responds to a constant magnitude sawtooth input voltage signal and a variable AC square wave input voltage signal by generating inverter switch pulses when the magnitude of the sawtooth voltage and the magnitude of the AC square wave voltage are equal. The magnitude of the square wave voltage determines the degree of inverter pulse width modulation employed and the firing angle of the inverter switches.

APPARATUS FOR CONTROLLING PULSE WIDTH MODULATION OF INVERTER CIRCUITS

BACKGROUND OF THE INVENTION

The concept of harmonic neutralization of inverter output waveforms was originally introduced by T. M. Heinrich and A. Kernick in the copending application, "Static Inverter Wherein A Plurality of Square Waves Are So Summed As To Produce a Sinusoidal Output," Ser. No. 117,966, filed June 19, 1961, and assigned to the assignee of the present invention. This original concept of harmonic neutralization was based on a method of synthesizing a stepwise approximated sinusoidal output waveform by adding the outputs of K square wave inverter stages which are sequentially phase displaced from one another by π/K radians. The addition of the output waveforms is accomplished by series connecting the secondaries of the output transformers connected to each of the inverter stages.

This basic concept of harmonic neutralization has been subsequently refined by T. M. Heinrich and J. Rosa in the copending, cofiled patent application (Case 41,135) entitled "Method and Apparatus for Harmonic Neutralization of Inverters," Ser. No. 18,549, filed Mar. 11, 1970 and assigned to the assignee of the present invention. The refinement comprises the cascade, or concatenated, connection of the inverter stage output transformers to achieve the same degree of harmonic neutralization while reducing the required KVA transformer rating and consequently transformer size, weight, and cost.

Pulse width modulation control of harmonic neutralized inverters has been concerned exclusively with the double pole type of inverter, i.e., an inverter in which each power stage consists of full bridge circuits, each bridge including four switching elements.

The refined harmonic neutralization technique disclosed by Heinrich and Rosa permits pulse width modulation of single pole inverters.

SUMMARY OF THE INVENTION

The invention comprises apparatus for regulating the output voltage of single pole inverter circuits.

Individual comparator circuits are associated with each single pole circuit of an inverter and produce pulse width modulated waveforms for controlling the firing of the electronic switches comprising the single pole circuit. This pulse width modulated waveform is generated by the comparator circuits in response to input signals comprised of a variable AC square wave of the same frequency and phase displacement as the unmodulated single pole output voltage and a constant magnitude sawtooth voltage to a frequency which is a multiple of the fundamental output frequency of the single pole circuit.

The pulse width modulation of the single pole circuit and the firing angle of the electronic switches is controlled by varying the magnitude of the AC square wave relative to the maximum, or peak value, of the sawtooth voltage.

DESCRIPTION OF THE DRAWING

The invention will become more readily apparent from the following exemplary description in connection with the accompanying drawings.

FIG. 6 is a schematic illustration of a circuit refinement to the embodiment of FIG. 1.

DESCRIPTION OF THE PREFERRED EMBODIMENT

Figure 1:
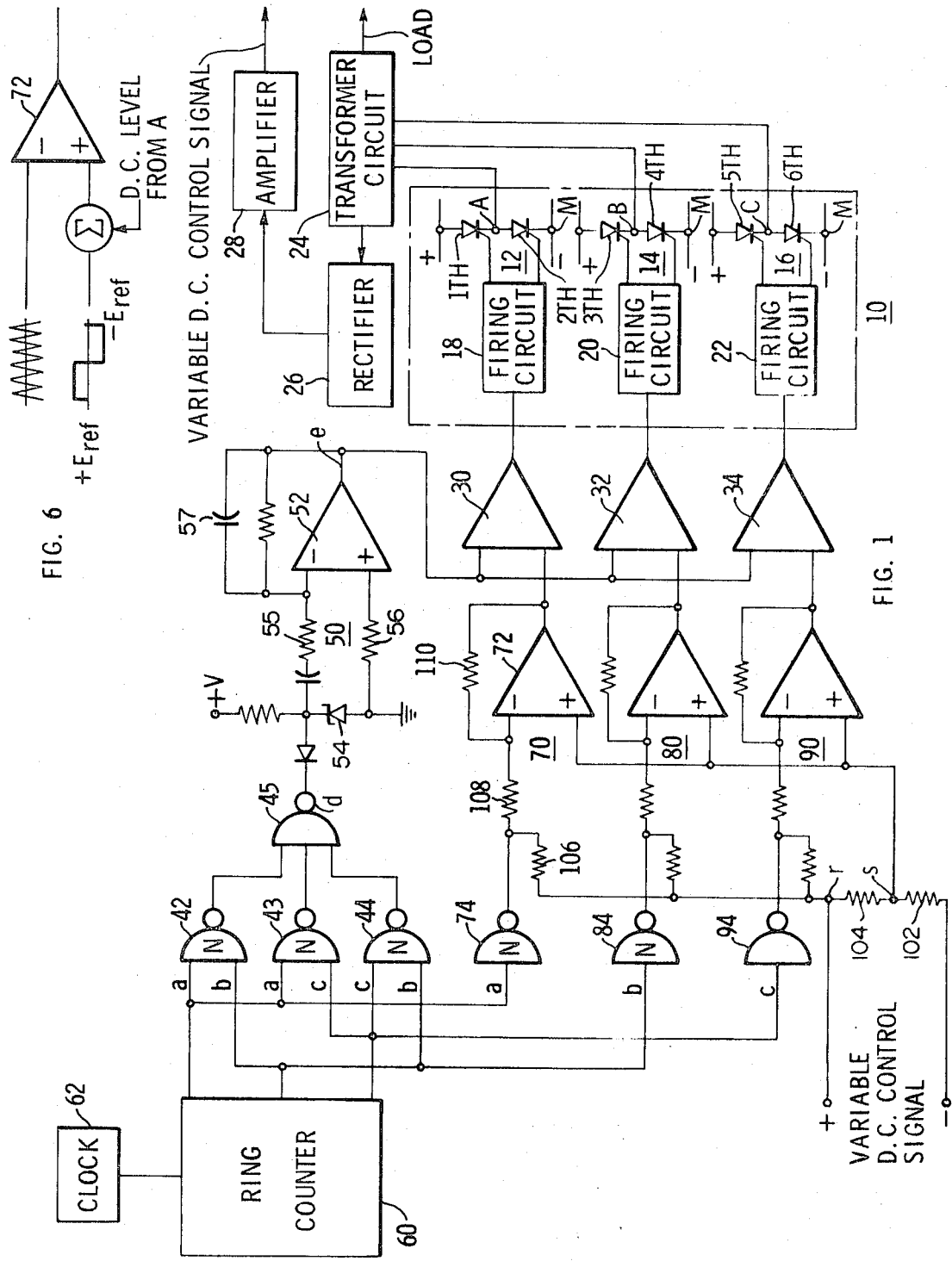
FIG. 1 is a schematic illustration of a circuit embodying the invention.

Referring to Fig. 1 there is illustrated schematically a three phase inverter circuit 10 comprised of single pole, or half bridge power stages, 12, 14 and 16 arranged in a three phase configuration. Firing circuits 18, 20 and 22 initiate the conduction of inverter switching devices, herein defined as the thyristors 1TH–6TH, which are associated with the half bridge power stages 12, 14 and 16 respectively. Complementary square wave output signals from the firing circuits 18, 20 and 22 provide alternate conduction of the thyristor pairs comprising each half bridge circuit. The resultant square wave output signals developed at the pole outputs A, B and C of the half bridge power stages 12, 14 and 16 are subsequently synthesized by the transformer circuit 24 to develop a sinusoidal output waveform.

The firing circuits 18, 20 and 22 initiate the gating of inverter thyristors 1TH–6TH in response to square wave outputs developed at the outputs of the comparator circuits 30, 32 and 34 respectively. The duration and magnitude of the positive and negative pulses comprising the square wave outputs of the comparator circuits determines the firing angles of the thyristors of the associated half bridge circuits. The variation of the firing angle of the thyristors is called pulse width modulation and is employed to vary the magnitude of the inverter sinusoidal output waveform. The complement of the square wave pulses which initiate the firing of the thyristor 1TH of the half bridge power stage 12 controls the firing of the thyristor 2TH. This relationship applies also to the thyristors of the half bridge circuits 14 and 16.

Figure 2:
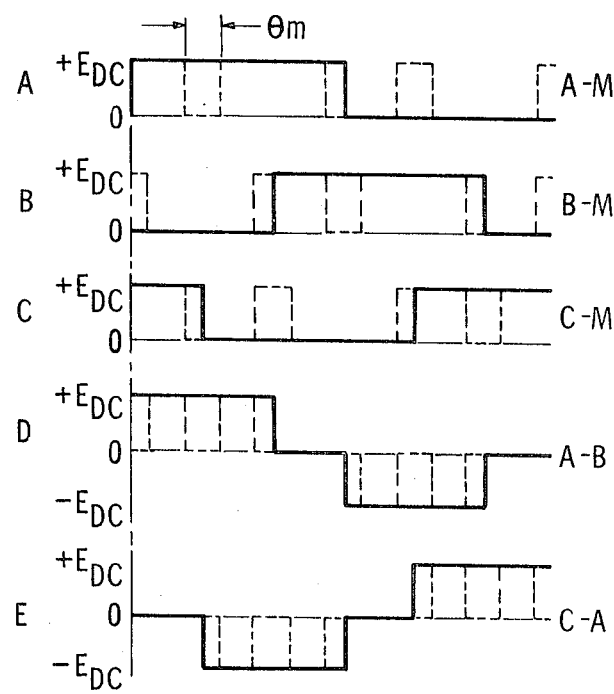
FIGS. 2, 3, 4 and 5 are waveform illustrations of the operation of embodiment of FIG. 1.

The pulse width method of regulation is typically illustrated in the waveforms of Fig. 2. The waveforms A, B and C of Fig. 2 represent the pole voltages A, B and C of half bridge power stages 12, 14 and 16 respectively as measured with respect to the DC minus M. The portion of the waveforms of FIGS. 2A, 2B and 2C illustrated in solid lines show the pole voltages in the "full on" state in which the firing of the thyristors of each half bridge circuit is controlled to connect their respective pole outputs A, B and C of bridge circuits 12, 14 and 16 alternately between the positive line for a complete half cycle and the negative DC line for a complete half cycle. The dotted waveforms A, B and C of FIG. 2 illustrate the pole voltages of half bridge circuits 12, 14 and 16 respectively as being pulse width modulated at a repetition rate which is three times the output frequency. The angle of modulation, $\theta m$, or firing angle for this waveform is 30°. The magnitude of the output voltage of the inverter circuit 10 is reduced through controlled pulse width modulation from the maximum value obtained under the "full on" condition. The waveforms D and E illustrate the pole-to-pole voltage outputs A–B and C–A respectively of the inverter circuit 10. In the "full on" state the pole-to-pole voltage outputs are quasi-square waves containing no third harmonic. In the reduced voltage or modulated form the pole-to-pole voltage waveforms are still void of third harmonics and may be combined with the outputs of other three phase inverter configurations (not shown) by means of the teachings of the above-identified applications for patents for harmonic neutralization to form a stepped waveform which approximates a sine wave.

In order to obtain the square wave outputs from the comparator circuits 30, 32 and 34 which provide the desired pulse width modulation of the inverter output waveform, a single sawtooth waveform developed by an integrator circuit 50 is applied to a first input of each comparator circuit, and a controllable AC square wave reference signal, $E_{ref}$, developed by circuits 70, 80 and 90 is applied to the second input of the comparator circuits 30, 32 and 34 respectively.

Figure 3:
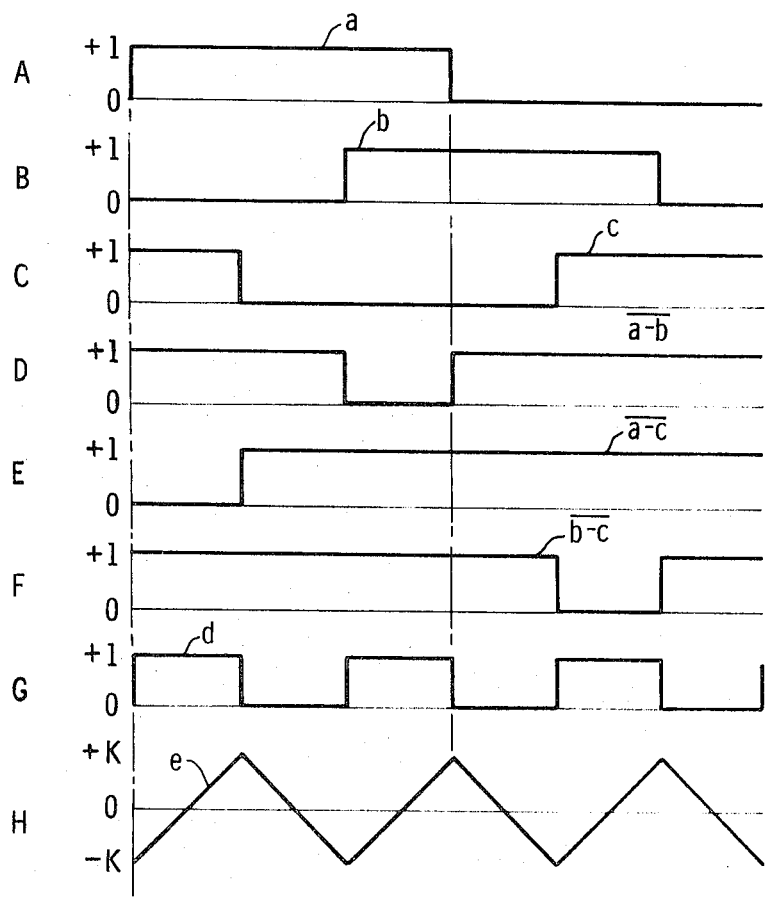

The sawtooth waveform, which has both positive and negative polarity segments and is symmetrical about the zero voltage value, is developed by the integrator circuit 50 in response to a square wave output developed by logic circuits 42, 43, 44 and 45 as illustrated in Fig. 3.

A master ring counter 60 responds to output pulse signals from a clock circuit 62 by generating 120° phase displaced square wave outputs corresponding to the waveshapes a, b and c waveforms A, B and C respectively. These square waves are subsequently applied to the dual input NAND-logic-gates 42, 43 and 44 in the manner illustrated in Fig. 1. The waveforms a, b and c generated by the master ring counter 60 correspond to the unmodulated inverter pole voltages of the half bridge power stages 12, 14 and 16 respectively. The operation of the NAND-logic-gates 42, 43 and 44 in response to the input square waves from the ring counter 60 is illustrated by the waveforms D, E and F of Fig. 3 which represent the outputs of the respective logic gates. These output waveforms are subsequently applied to the logic NAND-gate 45 which develops the waveform $d$ which is illustrated in FIG. 3G. The composite square wave output of NAND-gate 45 is capacitively coupled to the negative input of an operational amplifier 52 which is connected to operate as an integrator. The operational amplifier 52 develops a sawtooth output waveform $e$, which is illustrated in waveform 3, in response to the input square wave $d$. A zener diode 54 maintains the magnitude K of the input square wave constant while the integrator components, resistors 55 and 56, and capacitor 57 are chosen to produce a linear sawtooth output waveform. The sawtooth waveform $e$ thus developed is applied simultaneously to the negative inputs of each of the comparator circuits 30, 32 and 34. The second inputs to the comparator circuits are developed by variable AC square wave reference voltage circuits 70, 80 and 90 respectively. Inasmuch as the circuits 70, 80 and 90 are identical in structure and operation, the circuit description will be limited to the reference voltage signal, $E_{ref}$, developed by circuit 70. Furthermore it is apparent that the description of the operation of the comparator circuit 30 in response to the sawtooth waveform input and reference voltage input, $E_{ref}$, will be sufficient for a clear understanding of the operation of the comparator circuits 32 and 34.

A variable DC control signal developed by an external source (not shown) or provided in the form of a DC voltage signal representative of the AC inverter output after conditioning by rectifier 26 and amplifier 28, is applied across a divider network comprised of resistors 102 and 104. The DC voltage levels developed at points $r$ and $s$ by the divider network are applied to the input networks associated with the negative and positive terminals respectively of the operational amplifiers 72, 82 and 92. The operational amplifier 72 produces a DC output voltage the magnitude of which is related to the difference between the magnitudes of the input signals. In order to develop an AC square wave at the output of the operational amplifiers, the outputs of NAND-logic-gates 74, 84 and 94 are operatively connected to the negative input networks of the differential operational amplifiers 72, 82 and 92 respectively. The outputs of the NAND-gates 74, 84 and 94 are controlled by the phase displace square wave outputs $a$, $b$ and $c$ of the master ring counter 60. The effect of the NAND-gate 74 is to ground the signal applied to the minus input of the operational amplifier 72 during alternate logic states of the waveform $a$ and in so doing produce an AC square wave at the output of the operational amplifier circuit 72 which is of the same frequency and phase displacement as the unmodulated pole voltage of the half bridge circuit 12.

The gain of the operational amplifier 72 and the balance of the AC square wave output, i.e., the comparative magnitude of the positive and negative portions of the AC square wave with respect to zero, are functions of the resistance values of resistors 102, 104, 106, 108 and 110.

The comparator circuit 30 responds to the AC sawtooth waveform input and the AC square wave input, $E_{ref}$, by producing output logic changes between ZERO and ONE in response to variations in the magnitude of the AC square wave relative to the magnitude of the AC sawtooth waveform; the changes in logic output conditions of the comparator circuit 30 representing a pulse width modulated square wave corresponding to the waveform A-M of the half bridge power stage 12. This waveform controls the firing angle of the thyristors 1TH and 2TH. The degree of pulse width modulation employed, i.e., the control of the modulation angle $\theta m$ employed, is a function of the magnitude of $E_{ref}$ as is apparent from the waveforms of FIGS. 4 and 5. Since the magnitude of $E_{ref}$ is controlled by the DC control signal, $\theta m$ can be directly proportional to this signal.

Figure 4:
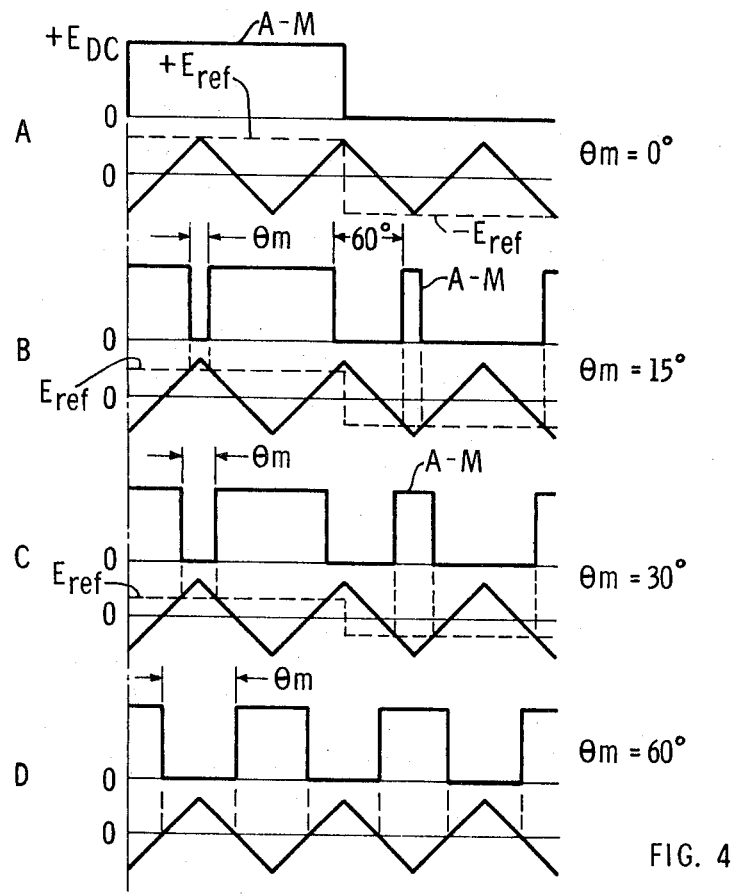

Waveforms A, B, C and D of FIG. 4 illustrate the pulse width modulated waveforms corresponding to waveform A-M of the half bridge power stage 12 as the modulation angle established by $E_{ref}$ varies from 0° to 60°. Whenever the AC square wave, $E_{ref}$, is of greater magnitude than the sawtooth waveform, a logic ONE output is produced, and whenever the magnitude of the sawtooth waveform is greater than that of $E_{ref}$, a logic ZERO output is produced. In actual practice, it is necessary to limit the modulation angle, $\theta m$, to a minimum value which will permit proper commutation or switching of the thyristors of the inverter circuit 10. One method of accomplishing this is to limit the peak magnitude of $E_{ref}$ so that it does not equal or exceed the peak magnitude of the sawtooth waveform.

Figure 5:
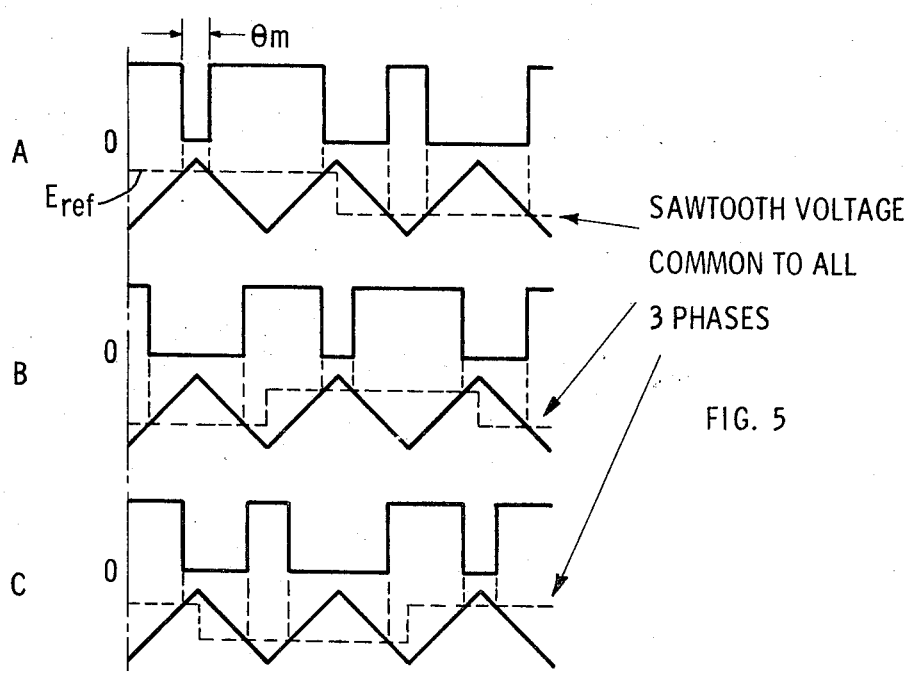

The waveforms A, B and C of FIG. 5 illustrate the pulse width modulated waveform representations of the output waveforms A-M, B-M and C-M of the half bridge power stages 12, 14 and 16 respectively as they are modulated at an angle of 30°. It is illustrated that the half bridge circuits utilize a common sawtooth waveform which is modulated by square waves having equal magnitudes but phase displaced from each other by 120°.

If the DC level of either the sawtooth waveform or the AC square wave $E_{ref}$ is slightly different from zero, a DC level would be present in the output voltages of the inverter half bridge circuits. This could be eliminated by the use of a negative feedback signal from the output of the half bridge circuit to the positive input of the respective comparator circuit as schematically illustrated in FIG. 6.

While the embodiment herein described defines a single three phase configuration, it is understood that additional three phase configurations may be added, each with its own sawtooth waveform generating circuit, but each utilizing a common clock-ring counter combination for driving the three phase configurations.

I claim:

1. In power inverter apparatus for converting DC voltage from a DC voltage source into an AC output voltage for application to an electrical load, the combination of, at least first and second single pole power stages, each comprised of conduction controlled switching devices operatively connected between said DC voltage source and said electrical load to develop first and second output pole voltages respectively in response to conduction control signals to form said AC output voltage, first circuit means for generating said conduction control signals to control said output pole voltages between an unmodulated, or a full output pole voltage condition, and a modulated, or reduced output pole voltage condition, second circuit means for developing a reference square wave of a frequency which is three times the fundamental frequency of said AC output voltage, said reference square wave being in identical phase relationship with each of said unmodulated pole voltages such that the leading edge of said unmodulated output pole voltages coincide with a leading edge of said reference square wave, third circuit means for integrating said reference square wave to develop a constant amplitude sawtooth voltage having quarter wave symmetry, positive and negative polarity segments symmetrically disposed about a zero voltage level and a frequency which is three times the fundamental frequency of said AC output voltage, fourth circuit means for generating at least first and second AC square waves, said square waves corresponding in frequency and phase displacement to the unmodulated output pole voltages of said first and second single pole power stages respectively, said first circuit means comparing sawtooth voltage to each of said AC square waves and transmitting conduction control signals to said first and second power stages when the respective AC square waves intersect said sawtooth voltage, the amplitude of said AC square waves determining the modulation angle of the respective conduction controlled power switching devices.

2. In power inverter apparatus as claimed in claim 1 further including feedback circuit means coupled between the outputs of said single pole power stages and said third circuit means to adjust the amplitude of said AC square wave voltage to compensate for DC content in the respective output pole voltages.

3. In power inverter apparatus as claimed in claim 14 including means for limiting the amplitude of the square wave reference voltage to a value less than the amplitude of said sawtooth voltage waveform.

4. In power inverter apparatus as claimed in claim 1 wherein the magnitude of the pulse shape voltage output of said fourth circuit means is a function of the respective pole voltages.

5. In a multiphase power inverter apparatus for supplying an AC output voltage to an electrical load from a source of direct current, the combination of, $n$ single pole power stages wherein $n$ is an integer and a multiple of 3, said single pole power stages comprised of conduction controlled power switching devices operatively connected between said source of direct current and said electrical load for developing said AC output in response to conduction controlled signals, $n$ comparator circuit means wherein each comparator circuit means has a first and second input and an output, the output of each comparator circuit means being operatively coupled to one of said single pole power stages, said comparator circuit means generating said conduction control signals to control the modulation angle of said conduction controlled power switching devices as a means for pulse width modulating the pole voltage outputs of the respective single pole power stages between an unmodulated output pole voltage corresponding to full voltage and a modulated output pole voltage corresponding to voltage less than full voltage, first circuit means for developing $n$ pulse shape outputs corresponding to the unmodulated output pole voltage of the respective single pole power stages, second circuit means operatively connected to the output of said first circuit means and responding to said pulse shape output voltages to develop a reference square wave having a frequency which is three times the fundamental frequency of said AC output voltage, said reference square wave being in identical phase relationship with each of said $n$ pulse shape outputs such that the leading edge of each of said pulse shape coincides with a leading edge of said reference square wave, third circuit means for integrating said reference square wave to develop an output sawtooth voltage of constant magnitude and quarter wave symmetry at a frequency which is three times the fundamental frequency of said AC output voltage, said sawtooth voltage having positive and negative polarity segments symmetrically disposed about a zero voltage level, fourth circuit means responding to the $n$ pulse shape outputs of said first circuit means by developing $n$ pulse shape outputs corresponding in frequency and phase displacement to the respective unmodulated pole voltage outputs and exhibiting positive and negative polarity segments, said sawtooth voltage being supplied to the first input of each of said $n$ comparator circuit means and the $n$ pulse shape outputs of said fourth circuit means being supplied to the second inputs of the respective comparator circuit means, said comparator circuit means generating conduction controlled signals for the respective single pole power stages when the pulse shape inputs of the respective comparator circuit means intersect said sawtooth reference voltage, the amplitude of said pulse shape inputs determining the modulation angle of the conduction controlled power switching devices of the respective single pole power stages.

6. In apparatus as claimed in claim 5 including means for limiting the magnitude of the pulse shape output voltage of said fourth circuit means to a voltage less than the peak value of the said sawtooth voltage.

7. In apparatus as claimed in claim 5 wherein the magnitude of the pulse shape output of said fourth circuit means is a function of the respective output pole voltages.

8. In apparatus as claimed in claim 5 including transformer circuit means for coupling the outputs of the single pole power stages.

* * * * *